United States Patent [19]
Reed et al.

[11] Patent Number: 5,325,620
[45] Date of Patent: Jul. 5, 1994

[54] CHAIR ATTACHED FISHING POLE SUPPORT

[76] Inventors: Bernard L. Reed; Nannie S. Reed, both of 2252 Meridian Ct., Columbus, Ohio 43232

[21] Appl. No.: 123,804

[22] Filed: Sep. 20, 1993

[51] Int. Cl.⁵ .............................................. A01K 97/10
[52] U.S. Cl. ........................................ 43/21.2; 43/17; 297/188; 211/70.8; 248/538
[58] Field of Search ................... 43/15, 16, 21.2, 17; 297/188, 194, 217; 211/107, 70.8; 248/538, 219.4, 230

[56] References Cited

U.S. PATENT DOCUMENTS

| | | | |
|---|---|---|---|
| 382,422 | 5/1888 | Heine | 211/107 |
| 521,619 | 6/1894 | Jordan | 248/230 |
| 1,815,353 | 7/1931 | Gerow | 248/538 |
| 1,893,702 | 1/1933 | Glenn | 211/107 |
| 2,155,097 | 4/1939 | Mendle | 211/107 |
| 3,667,708 | 6/1972 | Smeltzer | 43/21.2 |
| 4,063,701 | 12/1977 | Wray | 248/230 |
| 4,117,629 | 10/1978 | Ekdahl | 211/107 |
| 5,131,179 | 7/1992 | McEwer | 43/21.2 |

*Primary Examiner*—P. Austin Bradley
*Assistant Examiner*—James Miner
*Attorney, Agent, or Firm*—E. Michael Combs

[57] ABSTRACT

A fishing pole support for securement to a chair leg member is arranged such that the support includes an elongate body, having a body leg oriented at an acute angle relative to the body to support a fishing pole thereon. The body is arranged to include an arcuate flange arranged for reception within a receiving cup cavity permitting ease of assemblage of the shaft body and leg relative to the receiving cup. The receiving cup is integral with a split cylindrical sleeve secured to the chair member.

5 Claims, 4 Drawing Sheets

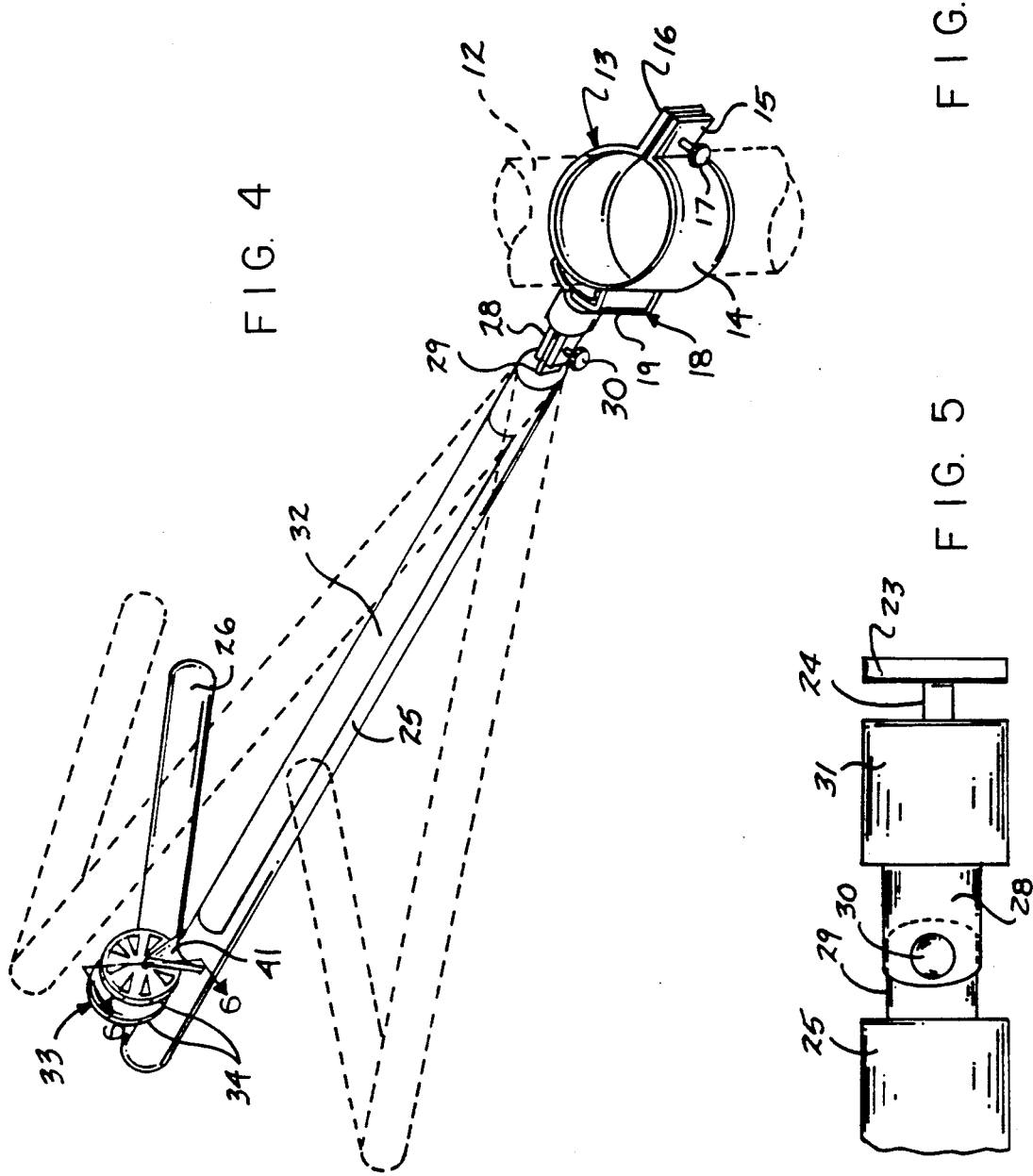

CHAIR ATTACHED FISHING POLE SUPPORT

BACKGROUND OF THE INVENTION

1. Field of the Invention

The field of invention relates to fishing pole accessory apparatus, and more particularly pertains to a new and improved chair attached fishing pole support wherein the same is arranged to provide for support to a fishing pole relative to a chair member.

2. Description of the Prior Art

Chairs of various types such as lawn chairs of a folding and stackable type, as well as wheelchairs and the like, are arranged to accommodate the instant invention to provide for support of a fishing pole to permit an individual to recline and enhance the enjoyment of a fishing procedure. While the prior art structure has been indicated to include U.S. Pat. Nos. 4,835,896; 4,159,816; and 5,063,701, the prior art has heretofore failed to permit the use of a readily mounted and dismounted fishing pole support arrangement arranged for ease of use as well as effectiveness in construction and in this respect, the present invention substantially fulfills this need.

SUMMARY OF THE INVENTION

In view of the foregoing disadvantages inherent in the known types of fishing pole apparatus now present in the prior art, the present invention provides a chair attached fishing pole support wherein the same is arranged for ease of mounting to an associated chair member to enhance enjoyment of a fishing procedure. As such, the general purpose of the present invention, which will be described subsequently in greater detail, is to provide a new and improved chair attached fishing pole support which has all the advantages of the prior art fishing apparatus and none of the disadvantages.

To attain this, the present invention provides a fishing pole support arranged for securement to a chair leg member, such that the support includes an elongate body having a body leg oriented at an acute angle relative to the body to support a fishing pole thereon, such that the body is arranged to include an arcuate flange arranged for reception within a receiving cup cavity permitting ease of assemblage of the shaft body and leg relative to the receiving cup, that in turn is integral with a split cylindrical sleeve secured to the chair member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved chair attached fishing pole support which has all the advantages of the prior art fishing apparatus and none of the disadvantages.

It is another object of the present invention to provide a new and improved chair attached fishing pole support which may be easily and efficiently manufactured and marketed.

It is a further object of the present invention to provide a new and improved chair attached fishing pole support which is of a durable and reliable construction.

An even further object of the present invention is to provide a new and improved chair attached fishing pole support which is susceptible of a low cost of manufacture with regard to both materials and labor, and which accordingly is then susceptible of low prices of sale to the consuming public, thereby making such chair attached fishing pole supports economically available to the buying public.

Still yet another object of the present invention is to provide a new and improved chair attached fishing pole support which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration of a modified fishing pole support structure.

FIG. 5 is an orthographic side view of the modified interconnection of the arcuate flange and elongate body of the construction, as indicated in FIG. 4.

FIG. 6 is an orthographic cross-sectional illustration, taken along the lines 6—6 of FIG. 4 in the direction indicated by the arrows.

DESCRIPTION OF THE PREFERRED EMBODIMENT

Figure 1:
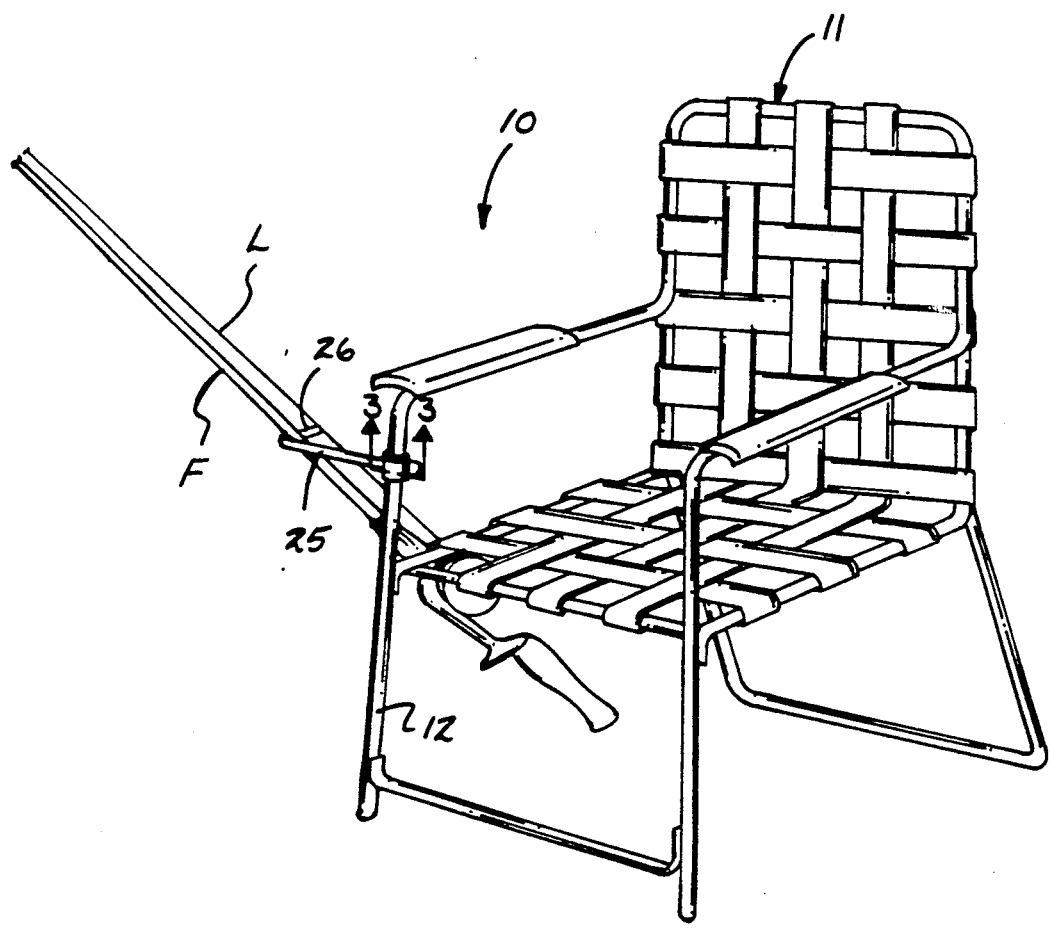
FIG. 1 is an isometric illustration of the invention.
Figure 2:
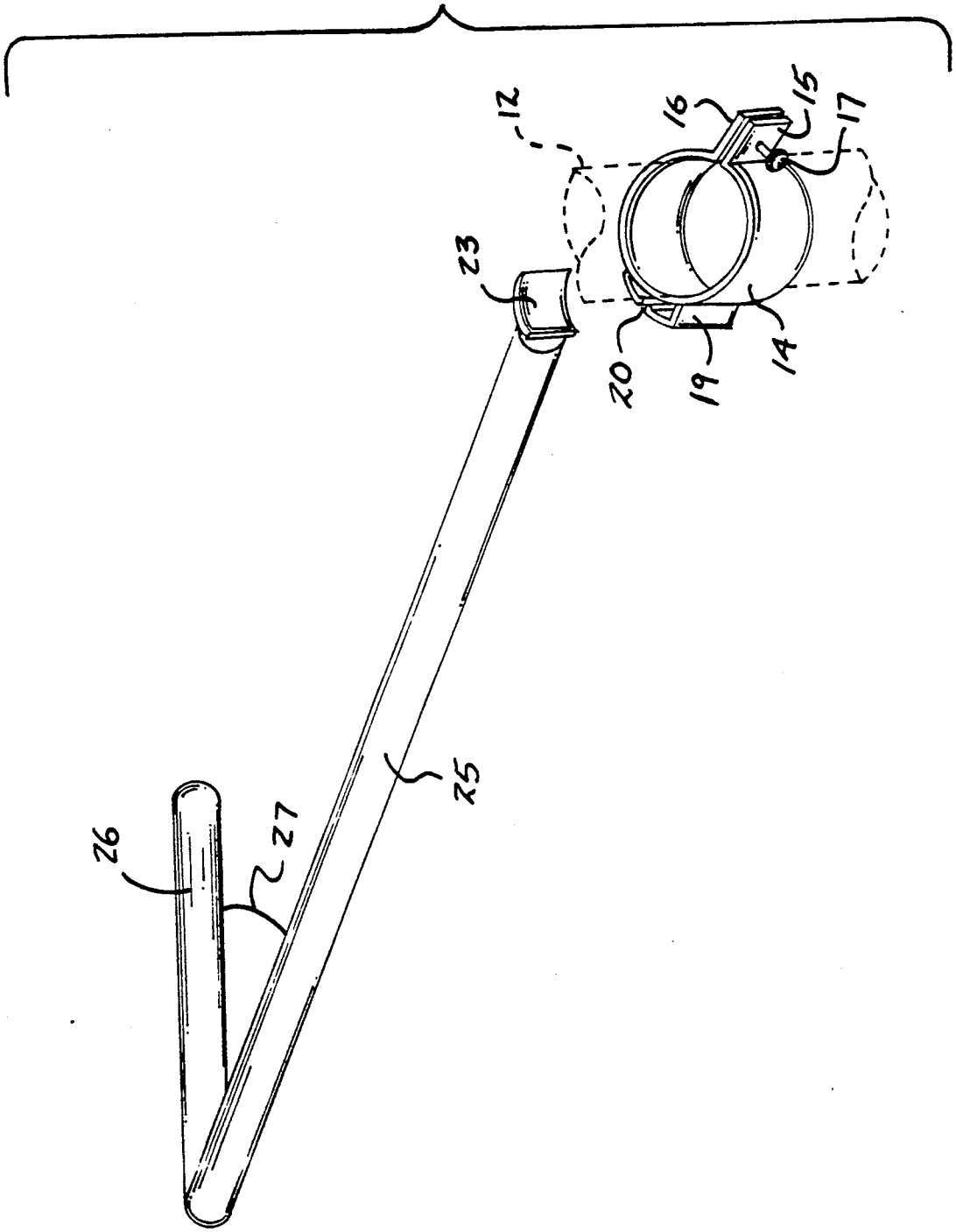
FIG. 2 is an enlarged isometric illustration of the support structure of the invention.

With reference now to the drawings, and in particular to FIGS. 1 to 6 thereof, a new and improved chair attached fishing pole support embodying the principles and concepts of the present invention and generally designated by the reference numeral 10 will be described.

Figure 3:
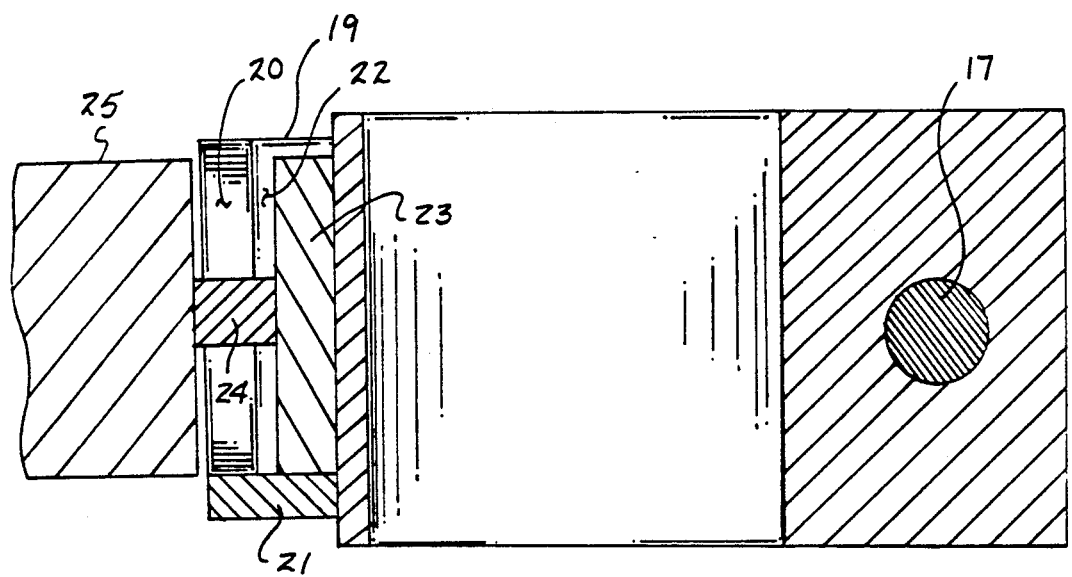
FIG. 3 is an orthographic cross-sectional illustration of the discontinuous sleeve structure arranged for mounting to an individual chair leg member.

More specifically, the chair attached fishing pole support 10 of the instant invention essentially comprises a chair member 11 arranged with conventional chair legs 12, such that the support structure of the invention includes a split cylindrical sleeve 13 and is discontinuous terminating in respective first and second flanges 15 and 16 arranged in a facing relationship relative to one another, with a fastener 17 threadedly directed through the first and second flanges 15 and 16 to permit securement of the flanges together for attachment to the chair leg 12. The sleeve 13 is formed with an outer side wall 14 mounting a receiving cup 18 integrally therewith diametrically opposed relative to the first and second flanges 15 and 16. The receiving cup 18 is formed with a cup side wall 19 having a slot 20 directed therethrough, with the cup further formed with a cup floor 21 in communication with the slot, such that an arcuate receiving cavity 22 is defined between the cup side wall and the split cylindrical sleeve outer side wall 14 to complementarily receive an arcuate flange 23, such as indicated in FIG. 3, therewithin. The arcuate flange 23 accordingly abuts the cup floor 21, with a flange support rod 24 directed through the cup side wall slot 20. The flange support rod 24 has coaxially and integrally mounted thereto a shaft body 25 extending longitudinally aligned relative to the flange support shaft 24 terminating in a shaft leg 26 mounted integrally to the shaft body at an acute included angle 27, such as indicated in the FIG. 2. Accordingly, the intersection of the shaft body and the shaft leg 25 and 26 respectively are arranged to receive a fishing pole "F", as indicated in FIG. 1, for their support, such that the fishing pole includes a conventional fishing line "L" for use in a conventional manner in a fishing procedure.

The FIG. 4 and the FIG. 5 indicates the use of a modified support structure, having the shaft body 25 including an abrasive laminate 32 thereon providing for ease of sharpening fishing hooks and the like for use by fishermen. The flange support rod 24 extends integrally into an intermediate body 31, that in turn mounts a bifurcated flange 28 receiving a securement flange 29, such that a further fastener 30 directed through the securement flange 29 and the bifurcated flange 28 secure the assembly together permitting pivoting of the shaft body 25 in a desired angulation relative to the split discontinuous cylindrical sleeve 13, as illustrated in FIG. 4. Further, at the junction of the flange support rod 24 and the shaft body 25 is formed an audio cylinder 33 rotatably mounted about an axle 40, that in turn is mounted to spaced support flanges 41 mounted in parallel adjacency to the audio cylinder spaced parallel end walls 34. A concave side wall 35 is oriented between the spaced end walls 34, with the end walls projecting radially beyond the concave side wall 35 to receive the fishing line therealong permitting rotation of the audio cylinder 33 upon a fish strike thereby directing the fishing line "L" along the concave side wall 35 in use. The audio cylinder 33 is formed with an audio cylinder cavity 36 divided by intersecting interior walls 37 to define discrete individual chambers 38, such that each of the chambers 38 includes a rattle sphere 39 to provide an audio signal upon a fishing line being directed thereacross to alert an individual sitting within the chair member 11 of the aforenoted fish strike. In this manner, it should be understood that the organization may be mounted to the chair member 11 which may be configured as noted to any variety of chair desired that is formed with a chair leg such as a wheelchair and the like permitting individuals of limited physical capacity to enjoy a fishing procedure in relative comfort.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A chair attached fishing pole support, comprising,
a split discontinuous cylindrical sleeve having an outer side wall, with the sleeve formed of a discontinuity including a first flange and a second flange arranged in a facing relationship on opposed sides of the discontinuity, with a fastener directed threadedly through the first flange and the second flange to permit securement of the first flange and the second flange together for securement of the split discontinuous cylindrical sleeve about a chair leg, and
a receiving cup mounted to the outer side wall, the receiving cup including a receiving cavity, and
an arcuate flange complementarily received within the receiving cavity, the receiving cup having a receiving cup side wall, with the receiving cup side wall having a side wall slot, with the arcuate flange having a flange supporting rod integrally mounted to the arcuate flange directed through the side wall slot, with a shaft body integrally mounted to the flange supporting rod at a first end of the shaft body, with the shaft body having a body second end, with the body second end including a shaft leg integrally mounted to the second end at an acute included angle to define an intersection of the shaft leg and the shaft body to position a fishing pole at the intersection.

2. A fishing pole support as set forth in claim 1 wherein the shaft body includes a bifurcated flange positioned in spaced adjacency relative to the flange supporting rod, and a securement flange received within the bifurcated flange mounted to the shaft body, with a further fastener directed through the bifurcated flange and securement flange to secure the bifurcated flange and securement flange in a predetermined angular orientation relative to one another.

3. A fishing pole support as set forth in claim 2 wherein the shaft body includes an abrasive laminate mounted thereon to permit sharpening of a fishing hook.

4. A fishing pole support as set forth in claim 3 including an audio cylinder mounted onto the shaft body adjacent the intersection, wherein the audio cylinder includes spaced parallel end walls, and a concave side wall positioned intermediate the spaced parallel end walls, with the spaced parallel end walls projecting radially beyond the concave side wall, with a support flange mounted onto the shaft body and the support flange having an axle, with the axle rotatably mounting the audio cylinder, with the audio cylinder including audio means therewithin for emitting an audio signal upon rotation of the audio cylinder.

5. A fishing pole support as set forth in claim 4 wherein the audio cylinder includes an audio cylinder cavity, with the audio cylinder cavity including a plurality of intersecting interior webs, with the audio cylinder cavity divided into discrete chambers within the audio cylinder cavity, with the audio means including a rattle sphere mounted within each of the chambers to emit an audio signal upon rotation of the audio cylinder.

* * * * *